(12) United States Patent  
Shibuya et al.

(10) Patent No.: US 12,429,722 B2  
(45) Date of Patent: Sep. 30, 2025

(54) LAMINATED GLASS

(71) Applicant: AGC Inc., Tokyo (JP)

(72) Inventors: Takashi Shibuya, Tokyo (JP); Junichi Kakuta, Tokyo (JP); Risa Kimura, Tokyo (JP); Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 338 days.

(21) Appl. No.: 18/104,254

(22) Filed: Jan. 31, 2023

(65) Prior Publication Data

US 2023/0168530 A1 Jun. 1, 2023

Related U.S. Application Data

(63) Continuation of application No. PCT/JP2021/029122, filed on Aug. 5, 2021.

(30) Foreign Application Priority Data

Aug. 7, 2020 (JP) .................................. 2020-135139

(51) Int. Cl.  
*G02F 1/1333* (2006.01)  
*G02F 1/137* (2006.01)

(52) U.S. Cl.  
CPC .... *G02F 1/133302* (2021.01); *G02F 1/13725* (2013.01); *G02F 2201/50* (2013.01)

(58) Field of Classification Search  
CPC ........... G02F 1/133302; G02F 1/13725; G02F 2201/50  
See application file for complete search history.

(56) References Cited

U.S. PATENT DOCUMENTS

2008/0316404 A1* 12/2008 Yamaki ............. G02F 1/133502  
349/118  
2020/0004088 A1 1/2020 Nakamura et al.  
(Continued)

FOREIGN PATENT DOCUMENTS

CN 110062909 A 7/2019  
CN 111051264 A 4/2020  
(Continued)

OTHER PUBLICATIONS

International Searching Authority, "International Search Report," issued in connection with International Patent Application No. PCT/JP2021/029122, dated Sep. 14, 2021.  
(Continued)

*Primary Examiner* — Anne M Hines  
(74) *Attorney, Agent, or Firm* — Foley & Lardner LLP (57) ABSTRACT

To prevent a light control device from being scarred.  
A laminated glass 10 comprises a pair of glass plates 11 and 12, and a light control device 15 formed between the pair of glass plates 11 and 12, having a liquid crystal layer 153, a substrate 151, a conductive film 152 formed on one surface 151S1 of the substrate 151 and a protective film 154 formed on the other surface 151S2 of the substrate 151. The liquid crystal layer has at least one member selected from the group consisting of guest-host liquid crystal, TN liquid crystal, PC liquid crystal, STN liquid crystal, ECB liquid crystal, OCB liquid crystal, IPS liquid crystal and VA liquid crystal. The protective film 154 has abrasion resistance higher than that of the substrate 151.

20 Claims, 3 Drawing Sheets

(56) References Cited

U.S. PATENT DOCUMENTS

2020/0057330 A1\* 2/2020 Yamazaki .............. H10K 59/50
2021/0103174 A1 4/2021 Ishii et al.

FOREIGN PATENT DOCUMENTS

| JP | 2018-106079 A | 7/2018 |
| JP | 2018-141891 A | 9/2018 |
| JP | 2019-025913 A | 2/2019 |
| JP | 2019-159139 A | 9/2019 |
| JP | 2020-007182 A | 1/2020 |
| JP | 2020-030355 A | 2/2020 |
| JP | 2020-116952 A | 8/2020 |
| WO | WO-2017/022591 A1 | 2/2017 |
| WO | WO-2017/203809 A1 | 11/2017 |
| WO | WO-2019/004160 A1 | 1/2019 |
| WO | WO-2019/107928 A1 | 6/2019 |

OTHER PUBLICATIONS

International Searching Authority, "Written Opinion," issued in connection with International Patent Application No. PCT/JP2021/029122, dated Sep. 14, 2021.

\* cited by examiner

LAMINATED GLASS

CROSS-REFERENCE TO RELATED APPLICATIONS

This application is a Bypass Continuation of PCT Application No. PCT/JP2021/029122, filed on Aug. 5, 2021, which is based upon and claims the benefit of priority from Japanese Patent Application No. 2020-135139 filed on Aug. 7, 2020. The contents of those applications are incorporated herein by reference in their entireties.

TECHNICAL FIELD

The present invention relates to a laminated glass.

BACKGROUND ART

As disclosed in Patent Document 1 for example, a laminate glass having a light control device sealed in an interlayer has been known. Such a light control device has a conductive film to make an electric current flow through a functional layer formed on a substrate.
Patent Document 1: JP-A-2018-141891

DISCLOSURE OF INVENTION

Technical Problem

Such a light control device may have scars on its outer surface e.g. when the laminated glass is assembled, thus creating drawbacks in outer appearance. Accordingly, it has been desired to prevent a light control device from being scarred.

Under these circumstances, the object of the present invention is to provide a laminated glass which can prevent a light control device from being scarred.

Solution to Problem

To solve the above problem and achieve the above object, the laminated glass according to the present disclosure comprises a pair of glass plates, and
  a light control device formed between the pair of glass plates, having a liquid crystal layer, a substrate, a conductive film formed on one surface of the substrate and a protective film formed on the other surface of the substrate,
  wherein the liquid crystal layer has at least one member selected from the group consisting of guest-host liquid crystal, TN liquid crystal, PC liquid crystal, STN liquid crystal, ECB liquid crystal, OCB liquid crystal, IPS liquid crystal and VA liquid crystal, and
  the protective film has abrasion resistance higher than that of the substrate.

Advantageous Effects of Invention

According to the present invention, it is possible to prevent a light control device from being scarred.

DESCRIPTION OF EMBODIMENTS

Figure 1:
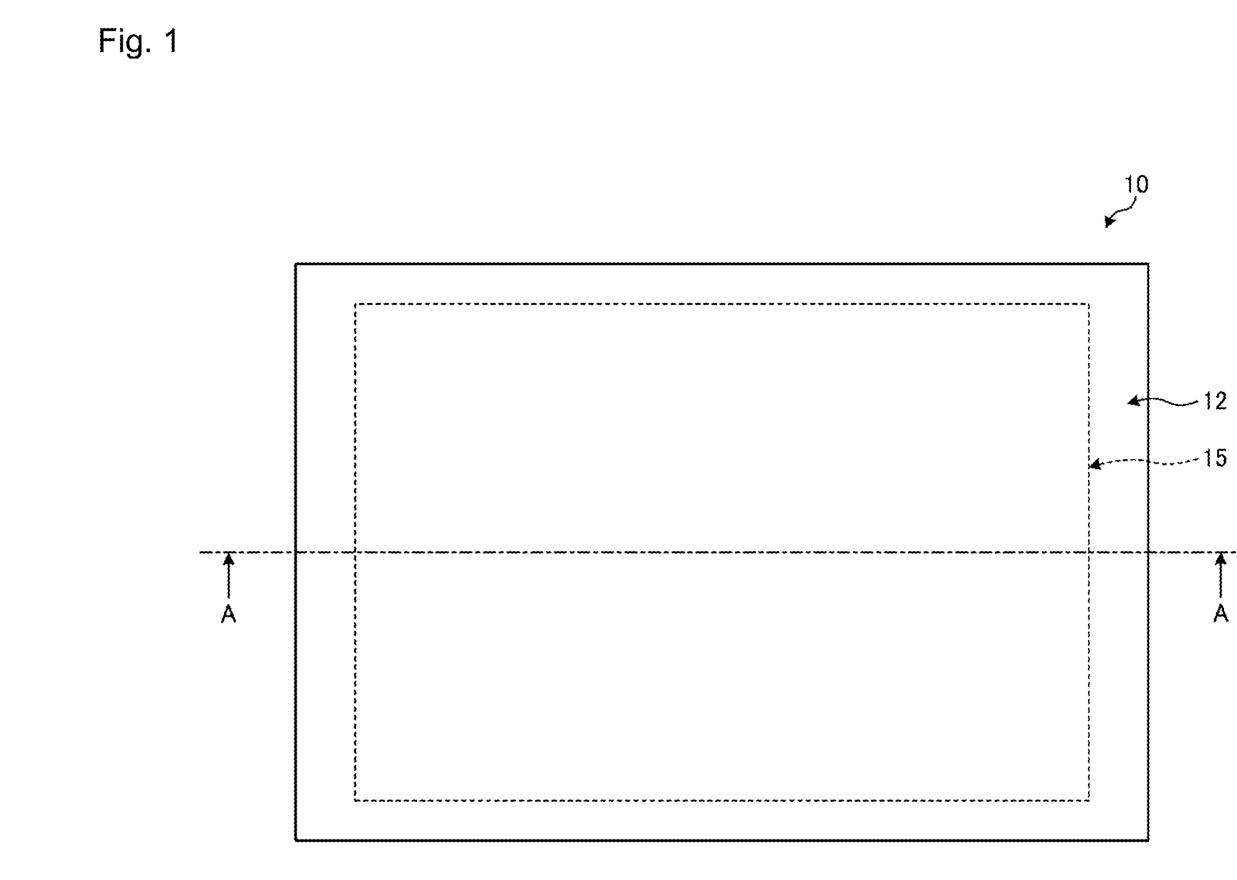
FIG. 1 is a schematic view illustrating a laminated glass according to the present embodiment.

Now, preferred embodiments of the present invention will be described in detail below with reference to the drawings. It should be understood that the present invention is by no means restricted to such embodiments, and a combination of two or more embodiments is included if any. Further, numerical values include rounded values.
(Laminated Glass)
FIG. 1 is a schematic view illustrating the laminated glass according to the present embodiment. The laminated glass 10 according to the present embodiment shown in FIG. 1 is a laminated glass for vehicles. The laminated glass 10 is applicable to, for example, roofs, rear windows, rear side windows, rear quarter windows, rear extra windows and windshields for vehicles. Rear extra windows are window glass attached on the vehicle rear side to improve the vehicle back visibility for drivers. Vehicles here typically mean automobiles but include moving objects having a window glass, including trains, ships, aircrafts, etc. However, the application of the laminated glass 10 is not limited to vehicles.

FIG. 1 schematically illustrates a state where the laminated glass 10 is attached to a vehicle, as viewed from the vehicle exterior side toward the vehicle interior side. In FIG. 1, the laminated glass 10 is shown in a flat plate shape but is not limited thereto, and may be in a curved shape in the long direction and in the short direction. Further, the laminated glass 10 may be curved only in the long direction or may be curved only in the short direction.

Further, in FIG. 1, the planar shape of the laminated glass 10 is rectangular, however, the planar shape of the laminated glass 10 is not limited to rectangular, and may be optional shape including trapezoidal and triangular. The planar shape here means a shape of a predetermined region of the laminated glass 10 as viewed from a direction normal to a plane on the vehicle interior side of the laminated glass 10. Further, in the following, the planar shape means to view a predetermined region of the laminated glass 10 in the direction Z shown in FIG. 2 (that is from the direction normal to a plane on the vehicle interior side of the laminated glass 10). The direction Z may be considered as the glass plate 12 side relative to the glass plate 11, and in a case where the laminated glass 10 is curved, may be considered as the convex surface side relative to the concave surface side.

Figure 2:
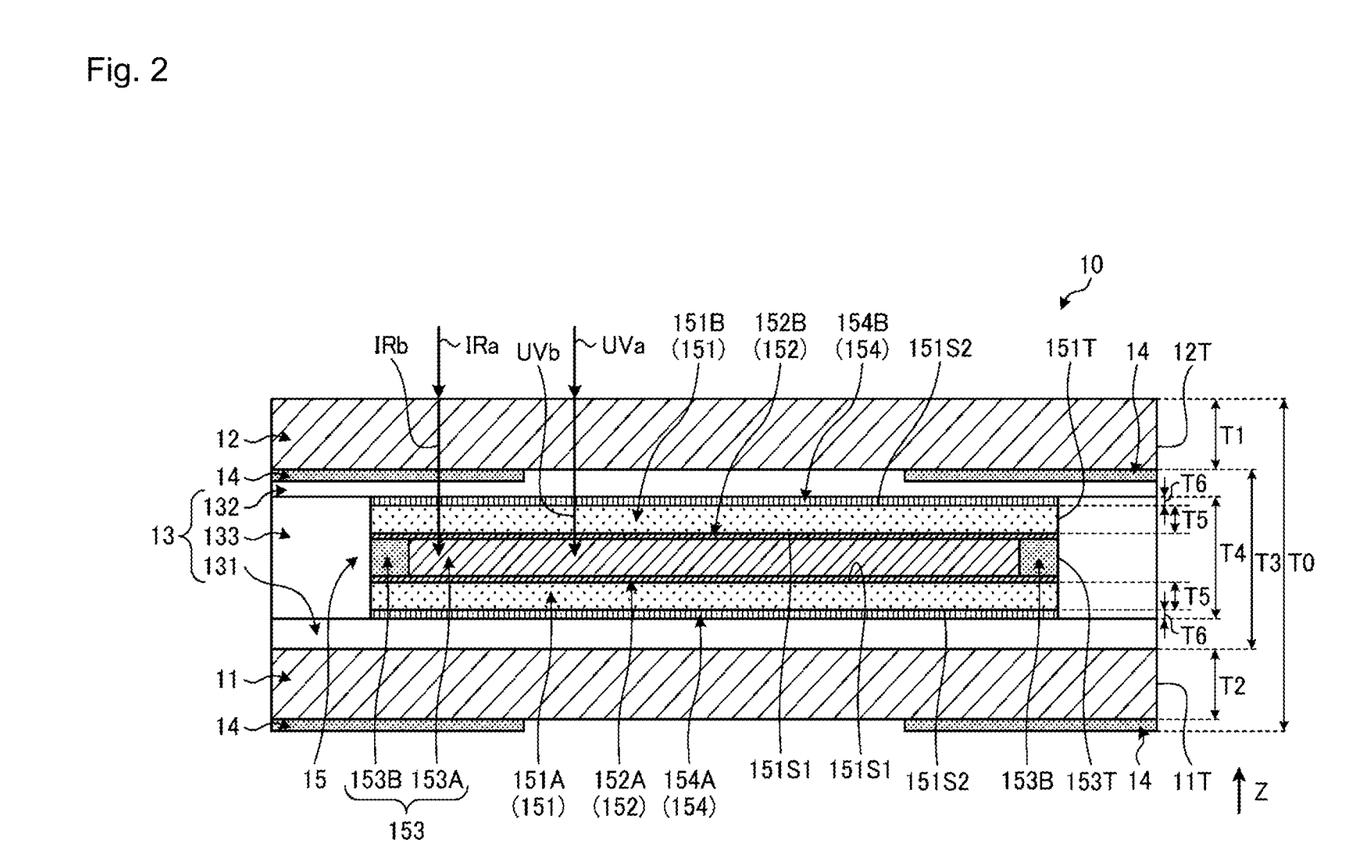
FIG. 2 is a schematic cross sectional view illustrating a laminated glass according to the present embodiment.

FIG. 2 is a schematic cross sectional view illustrating the laminated glass according to the present embodiment. FIG. 2 is a cross sectional view along the line A-A in FIG. 1. As shown in FIG. 2, the laminated glass 10 has glass plates 11 and 12, an interlayer 13, a shielding layer 14 and a light control device 15. Taking the direction from the vehicle interior side toward the vehicle exterior side as the direction Z, the laminated glass 10 has, in the direction Z, the shielding layer 14, the glass plate 11, the interlayer 13 and the light control device 15, the shielding layer 14, and the glass plate 12, laminated in this order. The direction Z may also be taken as the lamination direction. The shielding layer 14 is provided as the case requires.

The total thickness TO of the laminated glass 10 is preferably 2.8 mm or more and 10 mm or less. When the total thickness TO of the laminated glass 10 is 2.8 mm or more, sufficient stiffness will be secured. Further, when the total thickness of the laminated glass 10 is 10 mm or less, a sufficient transmittance will be obtained and at the same time, the haze can be reduced. The total thickness and the thickness described later mean the length in the Z direction.

The slippage between the glass plate 11 and the glass plate 12 at least at one side of the laminated glass 10, is preferably 1.5 mm or less, more preferably 1 mm or less. The slippage between the glass plate 11 and the glass plate 12 is the amount of slippage between the edge (peripheral portion) 11T of the glass plate 11 and the edge (peripheral portion) 12T of the glass plate 12 as viewed two-dimensionally. The slippage between the glass plate 11 and the glass plate 12 at least at one side of the laminated glass 10 is preferably 1.5 mm or less, in that the outer appearance will not be impaired, and the slippage is more preferably 1.0 mm or less, in that the outer appearance will not be impaired.

(Glass Plate)

The glass plate 11 and the glass plate 12 are a pair of glass plates facing each other. The interlayer 13 and the light control device 15 are disposed between the glass plate 11 and the glass plate 12. The glass plate 11 and the glass plate 12 are bonded in a state where the interlayer 13 and the light control device 15 are sandwiched.

The glass plate 11 is a vehicle interior side glass plate to be on the vehicle interior side when the laminated glass 10 is attached to a vehicle. The glass plate 12 is a vehicle exterior side glass plate to be on the vehicle exterior side when the laminated glass 10 is attached to a vehicle. The glass plates 11 and 12 may have a predetermined curvature.

The glass plates 11 and 12 may be inorganic glass or organic glass. As inorganic glass, for example, soda lime glass, aluminosilicate glass, borosilicate glass, alkali free glass or quartz glass may be used without any particular restriction. The glass plate 12 disposed on the vehicle exterior side of the laminated glass 10 is preferably made of inorganic glass from the viewpoint of scar resistance, preferably soda lime glass from the viewpoint of forming property. In a case where the glass plates 11 and 12 are made of soda lime glass, clear glass, green glass containing iron contents in a predetermined amount or more, UV cut green glass or privacy glass may suitably be used.

The inorganic glass may be either non-tempered glass or tempered glass. Non-tempered glass is one obtained by forming molten glass into a plate, followed by annealing. Tempered glass is one having a compression stress layer formed on the surface of non-tempered glass.

Tempered glass may be either physically tempered glass such as air-tempered glass or chemically tempered glass. In a case of physically tempered glass, the glass surface may be tempered, for example, by forming a compression stress layer on the glass surface by a temperature difference between the glass surface and the glass interior e.g. by operation other than annealing, such as quenching a glass plate uniformly heated in bending, from a temperature in the vicinity of the softening point.

In a case of chemically tempered glass, the glass surface may be tempered, for example, after bending, by forming compression stress on the glass surface e.g. by ion exchange method. Further, glass which absorbs ultraviolet light or infrared light may be used, and glass is preferably transparent, but a glass plate colored to such an extent not to impair transparency may be used.

On the other hand, as a material of organic glass, a transparent resin such as a polycarbonate, an acrylic resin such as polymethyl methacrylate, a polyvinyl chloride or a polystyrene may be mentioned.

The shape of the glass plates 11 and 12 is not particularly limited to rectangular, and may be any shape with any curvature. For bending the glass plates 11 and 12, gravity forming, pressing, roller forming or the like may be employed. The method for forming the glass plates 11 and 12 is not particularly limited, and for example, in the case of inorganic glass, a glass plate formed by float process is preferred.

The thickness T1 of the glass plate 12 is not particularly limited and may suitably be selected depending upon the type, the portion, etc. of a vehicle to which the laminated glass 10 is applicable, usually within a range of 0.1 mm or more and 10 mm or less. The thickness T1 of the glass plate 12 is preferably 0.3 mm or more in that impact resistance can properly be kept and sufficient strength such as flying stone resistance is achieved, and it is more preferably 0.5 mm or more, further preferably 0.7 mm or more, particularly preferably 1.1 mm or more, most preferably 1.6 mm or more.

Further, the thickness T1 of the glass plate 12 is preferably 3 mm or less in view of mileage of the vehicle since the mass of the laminated glass 10 will not be too large, and it is more preferably 2.6 mm or less, further preferably 2.2 mm or less, particularly preferably 2.1 mm or less. The thickness T1 is preferably the thickness at the thinnest portion of the glass plate 12.

The glass plate 12 preferably has sufficient impact resistance for vehicles. The impact resistance may be evaluated by impact resistance test by UN R43. The impact resistance test is a test, for example, to examine whether safety glass such as a laminated glass for vehicles has pressure-sensitive adhesive property or strength required against impact by a small hard flying object Specifically, the test is carried out in such a manner that a laminated glass (safety glass) is kept at a predetermined temperature and then placed on a support frame so that the glass surface to be on the vehicle exterior side faces upward, and a steel ball is dropped by free fall from a predetermined height.

The same applies to the thickness T2 of the glass plate 11 to the thickness T1 of the glass plate 12. The glass plate 12 may have a composition different from the glass plate 11 and/or may have a thickness different from the glass plate 11. For example, the glass plate 11 may be thinner than the glass plate 12.

When the thickness T2 of the glass plate 11 is 1 mm or less, from the viewpoint of strength, the glass plate 11 is preferably chemically tempered glass.

A coating film having a function of water repellency, or ultraviolet or infrared shielding, a coating film having low reflection property, low emission property or antifouling property, or a coating film having an anti-condensation property may be formed on the opposite side from the interlayer 13 of least one of the glass plates 11 and 12. Further, an ultraviolet or infrared shielding, low emission, visible light absorption, or colored coating film, may be formed on the side in contact with the interlayer 13 of at least one of the glass plates 11 and 12. Further, low emission coating may be applied on the vehicle interior side of the glass plate 11.

That is, at least one of the glass plates 11 and 12 may have at least one of a water repellent layer, an ultraviolet shielding layer, an infrared reflecting layer, a low reflectance layer, a low emission layer, an anti-condensation layer, a visible light absorbing layer and a coloring layer. Such a layer may be provided on at least one of the glass plates 11 and 12, the interlayer 13, and a substrate 151 of the light control device 15 described later.

The glass plates 11 and 12 may have a flat plate shape or a curved shape. In a case where the glass plates 11 and 12 are curved inorganic glass plates. the glass plates 11 and 12 are bent after forming by float process and before bonding by the interlayer 13. Bending is carried out by heating and softening the glass. The glass heating temperature at the time of bending is from about 550° C. to about 700° C.

(Interlayer)

The interlayer 13 is a film bonding the glass plate 11 and the glass plate 12. The interlayer 13 has, for example, an interlayer 131 to be bonded to the glass plate 11, an interlayer 132 to be bonded to the glass plate 12, and a frame-formed interlayer 133 located between the interlayer 131 and the interlayer 132 and surrounding the outer periphery of the light control device 15. However, the interlayer 13 may not have the interlayer 133. Even in a case where the interlayer 13 has no interlayer 133, at the time of contact bonding in a process for producing the laminated glass 10, the outer periphery of the light control device 15 is surrounded by at least one of the interlayer 131 and the interlayer 132.

In the present embodiment, the interlayer 13 is such that the interlayers 131, 132 and 133 are separate and bonded at the time of production of the laminated glass 10, but the present invention is not limited to such an embodiment. For example, the interlayer 13 may be a single product from the beginning e.g. in a case where a material having high fluidity is poured between the glass plates 11 and 12 to form the interlayer 13.

For the interlayer 13, a thermoplastic resin is used in many cases, and for example, a thermoplastic resin which has been used for such a type of application, such as a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin or an ionomer resin may be mentioned. Further, a resin composition containing a modified block copolymer hydride disclosed in Japanese Patent No. 6065221 may also be suitably used.

As the material of the interlayer 13, among them, in view of excellent balance of various performances such as transparency, weather resistance, strength, adhesion, penetration resistance, impact energy absorption property, moisture resistance, heat shielding property and sound insulating property, a plasticized polyvinyl acetal resin is suitably used. Such a thermoplastic resin may be used alone or in combination of two or more. "Plasticized" in the plasticized polyvinyl acetal resin means being plasticized by addition of a plasticizer. The same applies to the other plasticized resins.

However, in a case where the light control device 15 is sealed in the interlayer 13, the device may be deteriorated by a specific plasticizer depending upon the type of the device to be sealed, and in such a case, it is preferred to use a resin containing substantially no such a plasticizer. That is, the interlayer 13 preferably contains no plasticizer in some cases. The resin containing no plasticizer may, for example, be an ethylene/vinyl acetate copolymer resin.

The polyvinyl acetal resin may be a polyvinyl formal resin obtained by reacting polyvinyl alcohol (hereinafter sometimes referred to as "PVA" as the case requires) and formaldehyde, a narrowly defined polyvinyl acetal resin obtained by reacting PVA and acetaldehyde, a polyvinyl butyral resin (hereinafter sometimes referred to as "PVB" as the case requires) obtained by reacting PVA and n-butyraldehyde, or the like. Particularly in view of excellent balance of various performances such as transparency, weather resistance, strength, adhesion, penetration resistance, impact energy absorbing property, moisture resistance, heat shielding property and sound insulating property, PVB is mentioned as a preferred polyvinyl acetal resin. Such a polyvinyl acetal resin may be used alone or in combination of two or more.

For the interlayer 13, a curable transparent resin also called Optical Clear Resin (OCR) or a transparent pressure-sensitive adhesive sheet also called Optical Clear Adhesive (OCA) may be used. By using the curable transparent resin or the transparent pressure-sensitive adhesive sheet, preparation of the laminate at ordinary temperature is possible, such being more preferred. As the curable transparent resin or the transparent pressure-sensitive adhesive sheet, an acrylic resin, a silicone resin, a urethane acrylate resin or an epoxy resin may, for example, be used. Such curable transparent resin and transparent pressure-sensitive adhesive sheet may be used alone or in combination of two or more.

The interlayer 13 preferably has a shear modulus at 25° C. of $1.0 \times 10^3$ Pa or more and $100.0 \times 10^6$ Pa or less, more preferably $1.0 \times 10^3$ Pa or more and $2.0 \times 10^6$ Pa or less. The shear modulus at 25° C. within the above range is preferred in that preparation of the laminate at ordinary temperature is possible, and production of the laminated glass will be easy. The shear modulus in this specification may be measured by subjecting a test specimen to dynamic viscoelasticity test by shear method at a frequency of 1 Hz for example by MCR301 manufactured by Anton Paar.

Further, in a case where the interlayer 13 is made of a material to be used as cured, such as OCR, the shear modulus at 25° C. after curing is preferably $1.0 \times 10^3$ Pa or more and $2.0 \times 10^6$ Pa or less. In a case where the interlayer 13 is formed of two or more materials, the above relation is satisfied preferably with respect to a material having the highest shear modulus.

However, the material forming the interlayer 13 is not limited to a thermoplastic resin, and the interlayer 13 may contain functional particles of e.g. an infrared absorber, a ultraviolet absorber or a light emitting agent. Further, the interlayer 13 may have a colored portion called a shade band.

The thickness of the interlayer 13 is preferably 0.3 mm or more at the thinnest portion. When the thickness of the interlayer 13 at the thinnest portion is 0.3 mm or more, sufficient impact resistance required for the laminated glass 10 will be achieved. The thickness of the interlayer 13 is preferably 3 mm or less at the thinnest portion. When the maximum value of the thickness of the interlayer 13 is 3 mm or less, the mass of the laminated glass 10 will not be too large. The maximum value of the thickness of the interlayer 13 is more preferably 2.8 mm or less, further preferably 2.6 mm or less.

Further, the thickness of the interlayer 13 means the thickness of the interlayer 13 alone excluding the thickness of the light control device 15. Accordingly, the thickness of the interlayer 13 means a length obtained by subtracting the thickness T4 of the light control device 15 from the thickness T3 from the glass plate 11 side surface of the interlayer 131 to the glass plate 12 side surface of the interlayer 132.

The thickest portion of the interlayer 13 means, for example, a portion where the light control device 15 is not sandwiched (a portion not overlapping with the light control device 15 as viewed two-dimensionally), and thus, the thickness of the interlayer 13 at the thickest portion corresponds to the thickness T3 since no light control device 15 is present. On the other hand, the thinnest portion of the interlayer 13 means, for example, a portion where the light control device 15 is sandwiched (a portion overlapping with the light control device 15 as viewed two dimensionally), and thus, the thickness of the interlayer 13 at the thinnest portion corresponds to a value obtained by subtracting the thickness T4 of the light control device 15 from the thickness T3.

The interlayer 13 may have four or more layers. For example, by the interlayer 13 having four or more layers such that the shear modulus of any layer excluding both the outermost layers is smaller than the shear moduli of both the outermost layers, e.g. by adjustment by a plasticizer, the sound insulating property of the laminated glass 10 can be improved. In such a case, the elastic moduli in shear of both the outermost layers may be the same or different.

Further, all of the interlayers 131, 132 and 133 contained in the interlayer 13 are preferably formed of the same material, however, a part or all of the interlayers 131, 132 and 133 may be formed of different materials.

For example, the interlayer 133 may be made of a material having a shear modulus lower than that of the interlayers 131 and 132. In a case where the shear modulus of the interlayer 133 is lower than the shear modulus of the interlayers 131 and 132, the sound insulating property of the laminated glass 10 can be improved.

Also in a case where the shear modulus of the interlayer 131 is lower than the shear modulus of the interlayers 132 and 133, the sound insulating property of the laminated glass 10 can be improved. Further, also in a case where the shear modulus of the interlayer 132 is lower than the shear modulus of the interlayers 131 and 133, the sound insulating property of the laminated glass 10 can be improved. However, from the viewpoint of the bonding property to the glass plates 11 and 12 and of the functional material sealed in the laminated glass 10, etc., the above resin material is preferably used for 50% or more of the film thickness of the interlayer 13.

To prepare the interlayer 13, for example, the above resin material for the interlayer is properly selected, and using an extruder, extruded in a heat-molten state. The extrusion conditions such as the extrusion rate of the extruder are set to be constant. Then, the extruded resin film is, for example stretched as the case requires, so that it has a curvature on the upper side and the lower side to be fitted to the design of the laminated glass 10, whereby the interlayer 13 is completed.

(Shielding Layer)

The shielding layer 14 is an opaque layer and may be provided, for example, in a strip shape along the peripheral portion of the laminated glass 10. The shielding layer 14 is an opaque (for example black) colored ceramic layer. The shielding layer 14 may be a colored interlayer having light shielding property, a colored film, or a combination of a colored interlayer and a colored ceramic layer. The colored film may be united with e.g. an infrared reflecting film. The colored interlayer and the colored film may be colored entirely in the thickness direction or may be colored only on its surface.

By the presence of the opaque shielding layer 14 on the laminated glass 10, deterioration of the resin such as urethan to hold the peripheral portion of the laminated glass 10 on the vehicle body by ultraviolet light can be suppressed. Further, electrodes and electrode extraction wires electrically connected to the light control device 15 can be shielded so as not to readily be visually recognized from at least one of the vehicle exterior side and the vehicle interior side.

The shielding layer 14 may be formed, for example, by applying a ceramic color paste containing fusible glass frit containing a black pigment on the glass plate e.g. by screen printing, followed by firing, but its production is not limited thereto. The shielding layer 14 may be formed, for example, by applying an organic ink containing a black or deep color pigment on the glass plate e.g. by screen printing, followed by drying.

In the example shown in FIG. 2, the shielding layer 14 is provided at the peripheral portion on the vehicle interior side surface of the glass plate 11 and at the peripheral portion on the vehicle interior side surface of the glass plate 12. However, the present invention is not limited to such an embodiment, and the shielding layer 14 may be provided at only at least one of the peripheral portion on the vehicle interior side surface of the glass plate 11 and the peripheral portion on the vehicle interior side surface of the glass plate 12. In general, the glass plate located on the vehicle exterior side is more likely to be scarred than the glass plate located on the vehicle interior side, and thus the shielding layer 14 is not provided on the vehicle exterior side surface of the glass plate 12 in many cases.

(Light Control Device)

The light control device 15 is a device capable of changing the light transmittance of the laminated glass 10. The light control device 15 may be disposed on substantially the entire laminated glass 10 or may be disposed on at least part thereof. The planar shape of the light control device 15 is, for example, a rectangle smaller than the planar shape of the laminated glass 10. However, the planar shape of the light control device 15 may not be rectangular. In the example shown in FIG. 1, the periphery of the light control device 15 is located to overlap with the shielding layer 14 as viewed two-dimensionally.

As shown in FIG. 2, the light control device 15 has a protective film 154A as a first protective film, a substrate 151A as a first substrate, a conductive film 152A as a first conductive film, a liquid crystal layer 153, a conductive film 152B as a second conductive film, a substrate 151B as a second substrate, and a protective film 154B as a second protective film, and is sealed in the interlayer 13. That is, the light control device 15 is surrounded by the interlayer 13. The light control device 15 has, in the direction Z, the protective film 154A, the substrate 151A, the conductive film 152A, the liquid crystal layer 153, the conductive film 152B, the substrate 151B and the protective film 154B laminated in this order.

Hereinafter, in a case where the substrate 151A and the substrate 151B are not distinguished, they are represented as the substrate 151, in a case where the conductive film 152A and the conductive film 152B are not distinguished, they are represented as the conductive film 152, and in a case where the protective film 154A and the protective film 154B are not distinguished, they are represented as the protective film 154.

The light control device 15 is, for example, in a film form. The thickness T4 of the light control device 15 is, for example, 0.05 mm or more and 0.5 mm or less, and is preferably 0.1 mm or more and 0.4 mm or less.

(Substrate)

The substrates 151A and 151B are a pair of substrates supporting the conductive films 152A and 152B and sandwiching the liquid crystal layer 153. The substrate 151A is disposed on the glass plate 11 side (on the vehicle interior side) than the liquid crystal layer 153, and the substrate 151B is disposed on the glass plate 12 side (on the vehicle exterior side) than the liquid crystal layer 153.

The substrate 151 is constituted preferably by a member having an elastic modulus in tension at 25° C. higher than that of the interlayer 13, and from the viewpoint of impact resistance, the elastic modulus in tension at 25° is preferably 1,000 MPa or more. In the present embodiment, the substrate 151 has an elastic modulus in tension at 25° C. higher than that of the interlayer 13 and thereby has higher impact resistance than the interlayer 13. In the present embodiment, at least one of the substrate 151A and the substrate 151B may be constituted by a member having an elastic modulus in tension at 25° C. higher than that of the interlayer 13. The elastic modulus in tension may be measured by a dynamic viscoelastic analyzer (for example, itk DVA-225).

Where the elastic modulus in tension at 25° C. of the substrate 151 is Es, and the elastic modulus in tension at 25° C. of the interlayer 13 is Ei, it is preferred that 3< (Es/Ei)/1,000<1,400, more preferably 10< (Es/Ei)/1,000<800, further preferably 20< (Es/Ei)/1,000<400. When Es/Ei is within such a range, the impact resistance can be properly improved by the substrate 151.

Further, in a case where the interlayer 13 is formed of OCR, since OCR has a low elastic modulus and is easily deformed and thus its elastic modulus in tension E at 25° C. can not directly be measured, the value E calculated from the correlation formula G=E/2 (1+v) with the shear modulus G at 25° C. using Poisson's ratio v, is taken as the elastic modulus in tension at 25° C.

Further, the substrate 151 has an in-plane phase difference to light having a wavelength of 590 nm of preferably 0 nm or more and 300 nm or less, more preferably 0 nm or more and 100 nm or less, further preferably 0 nm or more and 50 nm or less. When the in-plane phase difference is within such a range, light control can properly be conducted. The in-plane phase difference may be measured by an in-plane phase difference measuring device (for example on-line phase difference meter KOBRA-WI manufactured by Oji Scientific Instruments Co., Ltd).

The substrate 151 is preferably a transparent resin layer. The substrate 151 preferably contains, for example, at least one member selected from the group consisting of polyethylene terephthalate, polyethylene naphthalate, polyamide, polyether, polysulfone, polyether sulfone, polycarbonate, polystyrene, cyclic polyolefin, polyarylate, polyetherimide, polyether ether ketone, polyimide, aramid, polybutylene terephthalate, triacetyl cellulose, polyurethane and a cycloolefin polymer.

The substrate 151A and the substrate 151B may be constituted for example by the same material as mentioned above, however, the present invention is not limited to such an embodiment, and they may be constituted by a different material.

The thickness T5 of the substrate 151 is for example 5 μm or more and 500 μm or less, preferably 10 μm or more and 200 μm or less, more preferably 50 μm or more and 150 μm or less. When the thickness T5 is 5 μm, decrease of impact resistance of the laminated glass 10 can suitably be suppressed, and when it is 500 μm or less, the thickness of the laminated glass 10 will not be too large.

The substrate 151A and the substrate 151B may have the same thickness T5 or may have different thicknesses.

Further, the thickness T5 of the substrate 151 may be preferably 2.5% or more and 50% or less to the thickness T3, more preferably 3% or more and 40% or less, further preferably 4% or more and 18% or less. When the thickness T5 to the thickness T3 is 2.5% or more, impact resistance can properly be improved, and when it is 50% or less, it is possible to prevent the thickness of the interlayer 13 from being relatively too small.

In the example in FIG. 2, the peripheral portion 151T of the substrate 151 is on the same position as the peripheral portion 153T of the liquid crystal layer 153 in the emission direction (Z direction), but is not limited to such an embodiment, and for example, it may extend to the outside of the peripheral portion 153T of the liquid crystal layer 153 in the emission direction. The peripheral portion 153T of the liquid crystal layer 153 is an edge (outer peripheral surface) in the emission direction of a sealing material 153B surrounding a light control portion 153A described later.

(Conductive film)

The conductive film 152A is formed on the surface 151S1 on the liquid crystal layer 153 side of the substrate 151A and is in contact with the surface on the glass plate 11 side of the liquid crystal layer 153. The conductive film 152B is formed on the surface 151S1 on the liquid crystal layer 153 side of the substrate 151B and is in contact with the surface on the glass plate 12 side of the liquid crystal layer 153. That is, the conductive films 152A and 152B are a pair of conduct films sandwiching the liquid crystal layer 153.

For the conductive film 152, for example, a transparent conducive oxide (TCO) may be used. As TCO, for example, tin-doped indium oxide (ITO), aluminum-doped zinc oxide (AZO) or indium-doped cadmium oxide may, for example, be mentioned, but TCO is not limited thereto.

For the conductive film 152, a transparent conductive polymer such as poly(3,4-ethylenedioxythiophene) (PEDOT) or poly(4,4-dioctylcyclopentadithiophene) may also be suitably used. Further, for the conductive film 152, a laminated film of a metal layer and a dielectric layer, a silver nanowire or a silver or copper metal mesh may also be suitably used.

The conductive film 152 may be formed, for example, by a physical vapor deposition (PVD) method such as sputtering method, vacuum deposition method or ion plating method. Otherwise, the first conductive film 152 may be formed by a chemical vapor deposition method (CVD) or wet coating method.

In the present embodiment, the conductive film 152 is formed over the entire surface of the substrate 151, however, the present invention is not limited thereto, and the conductive film 152 may be formed only on one part of the substrate 151. Further, the conductive film 152 is formed directly on the substrate 151, however, the present invention is not limited thereto, and another layer may be formed between the substrate 151 and the conductive film 152.

(Liquid crystal layer)

The liquid crystal layer 153 as the light control layer is located between the substrate 151A having the conductive film 152A formed and the substrate 151B having the conductive film 152B formed. The liquid crystal layer 153 has the light control portion 153A to conduct light control and the sealing material 153B to seal the outside of the light control member 153A. In the present embodiment, the liquid crystal layer 153 is a guest-host liquid crystal layer. The guest-host liquid crystal layer 153 has, for example, a liquid crystal composition having a nematic liquid crystal as a host and a dichroic dye as a guest dissolved in the nematic liquid crystal, contained in the light control portion 153A. The dichroic dye has a monoaxial light absorption axis and absorbs only light vibrating in the light absorption axis direction, and thus by changing the alignment of the dichroic dye depending upon the movement of the liquid crystal by the electric field and controlling the direction of the light absorption axis, the light transmission state is changed to conduct light control.

Here, the light control device 15 is not limited to having the guest-host liquid crystal layer 153. For example, the light control device 15 may have, as a light control layer, for example, at least one member selected from the group consisting of a suspended particle device (SPD), a guest-host liquid crystal, a photochromic device, an electrochromic device, an electrokinetic device, a polymer dispersed liquid crystal, a polymer network liquid crystal, an organic EL (Electro-Luminescence) device and an inorganic EL device. For example, in a case where the light control layer does not contain a liquid crystal and the like and no sealing material 153B is necessary, the sealing material 153B may not be provided. In such a case, the outer edge of the light control portion 153A acts as the peripheral portion of the light control layer.

In other words, the light control device 15 may have the substrate 151A having the conductive film 152A formed thereon and the substrate 151B having the conductive film 152B formed thereon, disposed to face each other, and the light control layer having at least one member selected form the group consisting of a suspended particle device, a guest-host liquid crystal, a photochromic device, an electrochromic device and an electrokinetic device, disposed between the conductive film 152A and the conductive film 152B facing each other.

As the suspended particle device, a conventional SPD film constituted by a polymer layer containing suspended particles which can be aligned by application of a voltage sandwiched between two substates inner surface of which is coated with the conductive film, may be used. Such a SPD film is in a highly transparent state by applying a voltage between the transparent conductive films by turning the power switch on to allow the suspended particles in the polymer to align. In a state where the power switch is off, the suspended particles in the polymer layer will not be aligned, the visible light transmittance is low, and the transparency is low.

As the SPD film, for example, a commercial product such as LCF-1103DHA (tradename, manufactured by Hitachi Chemical Co., Ltd.) may be used. Such a commercial product is supplied in a predetermined size and thus used as cut into a desired size. The thickness of the SPD film is not particularly limited and from the viewpoint of handling efficiency and availability, it is preferably 0.1 mm or more and 0.4 mm or less.

For the light control portion 153A, for example, at least one member selected from the group consisting of guest-host liquid crystal, TN (Twisted Nematic) liquid crystal, PC (Phase Change) liquid crystal, STN (Super Twisted Nematic) liquid crystal, ECB (Electrically Controlled Birefringence) liquid crystal, OCB (Optically Compensated Bend) liquid crystal, IPS (In-Plane Switching) liquid crystal, VA (Vertical Alignment) liquid crystal, FFS (Fringe Field Switching) liquid crystal, FPA (Field-induced Photo-reactive Alignment) liquid crystal, electrochromic device, electrokinetic device, organic EL (Electro-Luminescence) device and inorganic EL device may be used. Among them, it is preferred to use at least one member selected from the group consisting of guest-host liquid crystal, TN liquid crystal, PC liquid crystal, STN liquid crystal, ECB liquid crystal, OCB liquid crystal, IPS liquid crystal and VA liquid crystal.

(Protective film)

The protective film 154 is formed on the surface 151S2 on the opposite side of the substrate 151 from the surface 151S1 on which the conductive film 152 is formed. In other words, the substrate 151 has the conductive film 152 formed on the surface 151S1 on the liquid crystal layer 153 side, and has the protective film 154 formed on the surface 151S2 on the opposite side from the liquid crystal layer 153. In still other words, as shown in FIG. 2, the substrate 151A has the conductive film 152A formed on the surface 151S1, and has the protective film 154A formed on the surface 151S2. And, the substrate 151B has the conductive film 152B formed on the surface 151S1, and has the protective film 154B formed on the surface 151S2.

The protective film 154 is a hard coat having abrasion resistance higher than that of the substrate 151. For example, of the protective film 154, the change of the haze after abrasion resistance test as specified in JIS R3212:2015 for 100 rotations, is preferably smaller than the change of the haze after abrasion resistance test as specified in JIS R3212:2015 for 100 rotations with respect to the substrate 151. The abrasion resistance test as specified in JIS R3212:2015 may be conducted, for example, by using the substrate 151 having the protective film 154 and the substrate 151 having no protective film 154 as test samples. Further, of the protective film 154, the change of the haze after abrasion resistance test as specified in JIS R3212:2015 for 100 rotations is preferably 0% or more and 20% or less, more preferably 0% or more and 15% or less, further preferably 0% or more and 10% or less. When the abrasion resistance of the protective film 154 is within such a range, it is possible to properly prevent the light control device 15 from being scratched. Further, for example, by using, as the protective film 154, a cured film containing a compound having two or more functional groups in an amount of 30 mass % or more, it is possible to properly control the abrasion resistance of the protective film 154 to be within the above range. Further, the abrasion resistance ratio of the protective film 154 to the substrate 151 is preferably 50% or less, more preferably 40% or less, further preferably 30% or less. The abrasion resistance ratio of the protective film 154 to the substrate 151 here means, for example, the change of the haze after abrasion resistance test as specified in JIS R3212:2015 for 100 rotations, of the protective film 154, to the change of the haze after abrasion resistance test as specified in JIS R3212:2015 for 100 rotations, of the substrate 151. When the abrasion resistance ratio is within such a range, the protective film 154 can prevent the light control device 15 from being scarred while deformation of the light control device 15 is suppressed by flexibility of the substrate 151.

The protective film 154 has a transmittance for light having a wavelength of 550 nm of preferably 60% or more and 100% or less, more preferably 70% or more and 100% or less, further preferably 80% or more and 100% or less. When the transmittance is within such a range, visible light can properly be transmitted and effects of the light control device can properly be obtained. The transmittance is obtained from a difference in the transmittance as between before and after formation of the protective film 154.

The thickness T6 of the protective film 154 is preferably 0.1 µm or more and 20 µm or less, more preferably 0.2 µm or more and 15 µm or less, further preferably 0.3 µm or more and 10 µm or less. When the thickness of the protective film 154 is within such a range, the protective film 154 can properly prevent the light control device 15 from being scarred while the entire thickness of the light control device 15 is suppressed. Further, the protective film 154 is preferably thinner than the substrate 151. The thickness T6 of the protective film 154 is, to the thickness T5 of the substrate 151, preferably 0.1% or more and 50% or less, more preferably 0.1% or more and 20% or less, further preferably 0.1% or more and 15% or less. When the ratio of the thickness of the protective film 154 to the substrate 151 is within such a range, the protective film 154 can prevent the light control device 15 from being scarred while deformation of the light control device 15 is suppressed by impact resistance of the substrate 151.

The protective film 154A and the protective film 154B may have the same thickness T6 or may have different thicknesses.

The protective film 154 preferably contains, for example, at least one member selected from the group consisting of a cured product of a polymerization-curable compound having two or more polymerizable functional groups in its molecule (transparent coating film) and a cured product of a silicon-based alkoxide compound (transparent coating film). The polymerization-curable compound having two or more polymerizable functional groups in its molecule is, for example, applied to the substrate 151 and then cured by heat or by active energy ray such as ultraviolet light and becomes a cured product. Further, the silicon-based alkoxide compound is, for example, applied to the substrate 151 and cured by heat and becomes a cured product. The protective film 154A and the protective film 154B are constituted for example by the same material as mentioned above but are not limited thereto, and they may be constituted by different materials.

The content of the cured product in the protective film 154 is preferably 50 mass % or more and 100 mass % or less, more preferably 70 mass % or more and 98 mass % or less. Within such a range, higher abrasion resistance can be achieved.

Now, the polymerization-curable compound having two or more polymerizable functional groups in its molecule used for the protective film 154 will be described in further detail. The polymerization-curable compound having two or more polymerizable functional groups in its molecule may also be called a multifunctional compound in an active energy ray curable composition. The polymerization-curable compound here, that is the multifunctional compound in the active energy ray curable composition, has two or more active energy ray curable polymerizable functional groups. The active energy ray curable polymerizable functional group in the multifunctional compound is preferably an α, β-unsaturated group such as an acryloyl group, a methacryloyl group, a vinyl group or an allyl group, or a group containing it, more preferably an acryloyl group or a methacryloyl group. That is, the multifunctional compound is preferably a compound having two or more of at least one type of polymerizable functional group selected from an acryloyl group and a methacryloyl group. Among them, an acryloyl group is preferred, which is more likely to be cured by ultraviolet light. The multifunctional compound may be a compound having totally two or more of polymerizable functional groups of different types in one molecule, or may be a compound having totally two or more of polymerizable functional groups of the same type. The number of the polymerizable functional groups in one molecule of the multifunctional compound may be two or more, and the upper limit is not particularly limited. It is usually properly from 2 to 50, and is particularly preferably from 2 to 30.

Preferred as the multifunctional compound is a compound having two or more (meth)acryloyl groups. Among them, preferred is a compound having two or more (meth)acryloyloxy groups, that is a polyester of a compound having two or more hydroxy groups such as a polyhydric alcohol and (meth)acrylic acid. The polyester is preferably, for example, dipentaerythritol hexaacrylate, ditrimethylolpropane tetraacrylate, pentaerythritol (tri/tetra) acrylate, or trimethylolpropane triacrylate. They may be used alone or in combination of two or more.

In the active energy ray curable composition, as the multifunctional compound, two or more types of multifunctional compounds may be contained. Further, in addition to the multifunctional compound, a monofunctional compound having one polymerizable functional group polymerizable by active anergy ray may be contained. Such a monofunctional compound is preferably a compound having a (meth)acryloyl group, particularly preferably a compound having an acryloyl group.

The multifunctional compound may be a compound having a functional group or a bond in addition to the polymerizable functional groups. For example, it may have a hydroxy group, a carboxy group, a halogen atom, a urethane bond, an ether bond, an ester bond, a thioether bond or an amide bond. Particularly preferred is a (meth)acryloyl group-containing compound having a urethane bond (so called acrylic urethane) or a (meth)acrylic acid ester compound having no urethane bond.

The multifunctional compound is, in the case of an acrylic urethane, preferably an acrylic urethane which is a reaction product of pentaerythritol or its multimer polypentaerythritol, polyisocyanate and a hydroxyalkyl (meth)acrylate, or a trifunctional or higher (preferably 4 to 20 functional) acrylic urethane which is a reaction product of a hydroxy group-containing poly(meth)acrylate of pentaerythritol or polypentaerythritol, and polyisocyanate.

As the multifunctional compound having no urethane bond, preferred is pentaerythritol-based poly(meth)acrylate or isocyanurate-based poly(meth)acrylate.

The pentaerythritol-based poly(meth)acrylate means a (preferably 4 to 20 functional) polyester of pentaerythritol or polypentaerythritol and (meth)acrylic acid.

The isocyanurate-based poly(meth)acrylate means a (2 to 3 functional) polyester of tris(hydroxyalkyl) isocyanurate or an adduct obtained by adding 1 to 6 mole of caprolactone or alkylene oxide to 1 mol of tris(hydroxyalkyl) isocyanurate, and (meth)acrylic acid. It is also preferred to use such a preferred multifunctional compound and other bifunctional or higher multifunctional compound (particularly poly (meth)acrylate of polyhydric alcohol) in combination.

The active energy ray curable composition may contain colloidal silica having an average particle size of 200 nm or less in an amount effective to increase the surface hardness of the exposed layer. The average particle size of the colloidal silica is preferably from 1 to 100 nm, particularly preferably from 1 to 50 nm. Further, the colloidal silica is preferably the following surface-modified colloidal silica, in view of dispersion stability of the colloidal silica and improvement of adhesion of the colloidal silica and the multifunctional compound. The average particle size may be calculated as an average of respective particle sizes confirmed by observation with an electron microscope.

As a photopolymerization initiator used in the active energy ray curable composition, a known one may be used. An easily available commercial product is particularly preferred. The photopolymerization initiator may, for example, be an aryl ketone-based photopolymerization initiator (for example, an acetophenone, a benzophenone, an alkylamino benzophenone, a benzyl, a benzoin, a benzoin ether, a benzyl dimethyl ketal, a benzoyl benzoate or an α-acyloxime ester), a sulfur-containing photopolymerization initiator (for example, a sulfide or a thioxanthone), an acylphosphine-based polymerization initiator or another photopolymerization initiator. The photopolymerization initiators may be used in combination of two or more. Further, the photopolymerization initiator may be used in combination with a photosensitizer such as an amine.

The amount of the photopolymerization initiator in the active energy ray curable composition is, per 100 parts by weight of the curable component (the total amount of the multifunctional compound and the monofunctional compound), preferably from 0.01 to 20 parts by weight, particularly preferably from 0.1 to 10 parts by weight.

The active energy ray curable composition may contain, in addition to the above basic components, a solvent and various compounding agents. The solvent is preferably essential and for example, in a case where the multifunctional compound is not a liquid having a particularly low viscosity, a solvent is used.

The active energy ray to cure the above composition is particularly preferably ultraviolet light, but is not limited to ultraviolet light, and electron beams and other active energy ray may be used. As a ultraviolet source, a xenon lamp, a pulse xenon lamp, a low pressure mercury lamp, a high pressure mercury lamp, a ultrahigh pressure mercury lamp, a metal halide lamp, a carbon arc lamp or a tungsten lamp may, for example, be used.

The silicon-based alkoxide compound used as the protective film 154 preferably contains as the main component a cured product of an organopolysiloxane, and as the polyorganosiloxane forming the cured product, any curable polyorganosiloxane may be used without any restriction.

The organopolysiloxane is constituted by silicon-containing bond units called M units, D units, T units and Q units. Among them, the curable organopolysiloxane is an oligomeric polymer mainly constituted by T unis or Q units, and includes a polymer constituted only by T units, a polymer constituted only by Q units and a polymer constituted by T units and Q units. Further, such a polymer may sometimes further contain a small amount of M units or D units.

In the curable organopolysiloxane, the T unit is a unit having one silicon atom, and having, bonded to the silicon atom, one hydrogen atom or monovalent organic group and three oxygen atoms bonded to another silicon atom (or functional groups capable of being bonded to another silicon atom). The M unit is a unit having one silicon atom, and having, bonded to the silicon atom, three hydrogen atoms or monovalent organic groups and one oxygen atom bonded to another silicon atom (or functional group capable of being bonded to another silicon atom). The D unit is a unit having one silicon atom, and having, bonded to the silicon atom, two hydrogen atoms or monovalent organic groups and two oxygen atoms bonded to another silicon atom (or functional groups capable of being bonded to another silicon atom). The Q unit is a unit having one silicon atom, and having four oxygen atoms bonded to another silicon atom (or functional groups capable of being bonded to another silicon atom).

Among such curable organopolysiloxanes, a curable organopolysiloxane constituted by T units as the main silicon-containing bond units is preferably used. Hereinafter, unless otherwise specified, a curable organopolysiloxane will be referred to simply as an organopolysiloxane. In this specification, an organopolysiloxane constituted by T units as the main constituting units (hereinafter sometimes referred to as "organopolysiloxane (T)" as the case requires) means an organopolysiloxane having a proportion of T units to the total number of M units, D units, T units and Q units of from 50 to 100%, and in the present embodiment, more preferred is an organopolysiloxane having the proportion of T units of from 70 to 100%, particularly preferably from 90 to 100%. Further, as other units contained in a small amount in addition to the T units, D units and Q units are preferred, and Q units are particularly preferred.

That is, in the present embodiment, among such curable organopolysiloxanes, particularly preferred is an organopolysiloxane constituted only by T units and Q units in a ratio in number of T:Q=90 to 100:10 to 0.

The organopolysiloxane (T) used in the present embodiment is obtained by subjecting the above T monomer or the like to partial hydrolytic condensation. This reaction is carried out usually by heating the T monomer or the like and water in a solvent. It is preferred that a catalyst is present in the reaction system. A desired organopolysiloxane may be produced by adjusting the reaction conditions such as the type of the monomer, the amount of water, the heating temperature, the type and the amount of the catalyst, and the reaction time. Further, in some cases, it is possible to use a commercial organopolysiloxane as the desired organopolysiloxane as it is or to use a commercial organopolysiloxane to produce the desired organopolysiloxane.

For example, in a case where the material of the interlayer 13 is a curable transparent resin (OCR), it is preferred that the material of the substrate 151 is a polycarbonate and the material of the protective film 154 is a cured product of a polymerization-curable compound having two or more polymerizable functional groups in its molecule, and it is more preferred that the protective film 154 contains a compound containing a hydrolyzable silyl group, whereby particularly in the guest-host light control device 15, compatibility with the interlayer 13 will be favorable, and the impact resistance and scar resistance will properly be imparted by the substrate 151 and the protective film 154, while deformation of the light control device 15 is suppressed by flexibility of the interlayer 13.

The protective film 154 may be formed, for example, by applying the polymerization-curable compound having two or more polymerizable functional groups such as an acryloyl group in its molecule to the substrate and cured by heat or active energy rays such as ultraviolet light.

The protective film 154 is, as described above, formed on the surface 151S2 on the opposite side of the substrate 151 from the liquid crystal layer 153, and may also be said to be formed on the outermost side of the light control device 15 in the Z direction. However, the protective film 154 may be formed also on the surface 151S2 on the liquid crystal layer 153 side of the substrate 151, more particularly, between the substrate 151 and the conductive film 152. Further, the protective film 154 is formed on the entire surface of the substrate 151, however, the present invention is not limited thereto, and the protective film 154 may be formed only on a part of the substrate 151. Further, in the present embodiment, the protective film 154 is formed directly on the substrate 151, however, the present invention is not limited thereto, and another layer may be formed between the substrate 151 and the protective film 154.

(Ultraviolet absorbing layer)

The above-constituted light control device 15 preferably contains an ultraviolet absorbing layer which absorbs ultraviolet light. By the light control device 15 containing an ultraviolet absorbing layer, transmission of ultraviolet light toward the vehicle interior side can be suppressed. Since the liquid crystal layer 153 is deteriorated by ultraviolet light, the ultraviolet absorbing layer is formed preferably on the vehicle exterior side than the liquid crystal layer 153.

Here, as shown in FIG. 2, ultraviolet light which enters from outside the glass plate12 on the vehicle exterior side into the laminated glass 10 is taken as ultraviolet light UVa, and incident ultraviolet light which progresses inside the laminated glass 10 and enters the liquid crystal layer 153 is taken as UVb. And, the intensity of ultraviolet light UVb to the intensity of ultraviolet light UVa is taken as the ultraviolet transmittance of the laminated glass 10 (the vehicle exterior side). The ultraviolet light UVb may be considered as ultraviolet light UVa which has passed through a portion on the vehicle exterior side than the liquid crystal layer 153 in the laminated glass 10, and the ultraviolet transmittance may be considered as the ultraviolet transmittance of a portion on the vehicle exterior side than the liquid crystal layer 153 in the laminated glass 10. The ultraviolet transmittance may be calculated in accordance with ISO 9050:2003. The ultraviolet transmittance at a wavelength of 380 nm of the laminated glass 10 thus defined is preferably 0% or more and 20% or less, more preferably 0% or more and 15% or less, further preferably 0% or more and 10% or less. Further, to protect the liquid crystal layer 153, it is important to shut off light at a wavelength of 400 nm in addition to a wavelength of 380 nm. Accordingly, the ultraviolet transmittance at a wavelength of 400 nm of the laminated glass 10 is preferably 0% or more and 20% or less, more preferably 0% or more and 15% or less, further preferably 0% or more and 10% or less.

In the example of the present embodiment, the protective film 154 preferably has ultraviolet absorbing function. The protective film 154 functions as the ultraviolet absorbing layer by containing an ultraviolet absorber in a base material. The base material here means the above described material of the protective film 154, and as the ultraviolet absorber, a known one may be used, and one or more ultraviolet absorbers may be used in combination. The ultraviolet absorber may, for example, be 2-hydroxy-4-(2-methacryloyloxyethoxy)benzophenone, 2-hydroxy-4-(4-methacryloyloxybutoxy)benzophenone, 2,2'-dihydroxy-4-(2-methacryloyloxyethoxy)benzophenone, 2,4-dihydroxy-4'-(2-methacryloyloxyethoxy)benzophenone, 2,2',4-trihydroxy-4'-(2-methacryloyloxyethoxy)benzophenone, 2-hydroxy-4-(3-methacryloyloxy-2-hydroxypropoxy)benzophenone, 2-hydroxy-4-(3-methacryloyloxy-1-hydroxypropoxy)benzophenone, 2-(2-hydroxy-5-methacryloyloxyphenyl)-2H-benzotriazole, 2-(2-hydroxy-3-tert-butyl-5-methacryloyloxymethylphenyl)-2H-benzotriazole, 2-[2-hydroxy-5-(2-methacryloyloxyethyl)phenyl]-2H-benzotriazole, 2-[2-hydroxy-3-tert-butyl-5-(2-methacryloyloxyethyl)phenyl]-5-chloro-2H-benzotriazole, 2-[2-hydroxy-3-methyl-5-(8-methacryloyloxyoctyl)phenyl]-2H-benzotriazole, 6-methyl-heptyl 2-[4-(4,6-bis-biphenyl-4-yl-[1,3,5]triazin-2-yl)-3-hydroxy-phenoxy]-propionate, 6-methyl-heptyl 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionate, a reaction product of 2-(4,6-bis(2,4-dimethylphenyl)-1,3,5-triazin-2-yl)-5-hydroxyphenyl and oxirane, 2,4-bis[2-hydroxy-4-butoxyphenyl]-6-(2,4-dibutoxyphenyl)-1,3,5-triazine, a reaction product of 2-(2,4-dihydroxyphenyl)-4,6-bis(2,4-dimethylphenyl)-1,3,5-triazine and (2-ethylhexyl)-glycidate, or 4,6-dibenzoyl resorcinol.

The benzodithiol compound may, for example, be 2-(4,7-dihydroxy-1,3-benzodithiol-2-ylidene)-4,4-dimethyl-3-oxopentanenitrile, 2-cyano-2-(4,7-dihydroxy-1,3-benzodithiol-2-ylidene)-2-ethylhexyl acetate, 2-(4,7-dihydroxy-1,3-benzodithiol-2-ylidene)propanedinitrile, 1,2-dibutyl-4-(4,7-dihydroxy-1,3-benzodithiol-2-ylidene)-3,5-pyrazolidinedione, 4-(4,7-dihydroxy-1,3-benzodithiol-2-ylidene)-3-(1,1-dimethylester)-5(4H)-isoxazolone, 4-(4,7-dihydroxy-1,3-benzodithiol-2-ylidene)-1,2-diphenyl-3,5-pyrazolidinedione, 2-(4,7-dihydroxy-5-methyl-1,3-benzodithiol-2-ylidene)propanedinitrile, 2,2'-(4,8-dihydroxybenzo[1,2-d:4,5-d']bis[1,3]dithiol-2,6-diylidene)bis[4,4-dimethyl-3-oxopentanenitrile], 2,2'-(4,8-dihydroxybenzo[1,2-d: 4,5-d']bis[1,3]dithiol-2,6-diylidene)bis[2-cyano-1,1'-bis(2-ethylhexyl)acetate], or 4,4'-(4,8-dihydroxybenzo[1,2-d:4,5-d'] bis[1,3]dithiol-2,6-diylidene)bis[2,4-hidhydro-5-methyl-2-phenyl-3H-pyrazol-3-one]. In such a case, both the protective films 154A and 154B may be the ultraviolet absorbing layers, or, the protective film 154A on the vehicle interior side may not be the ultraviolet absorbing layer and only the protective film 154B on the vehicle exterior side may be the ultraviolet absorbing layer.

Figure 3:
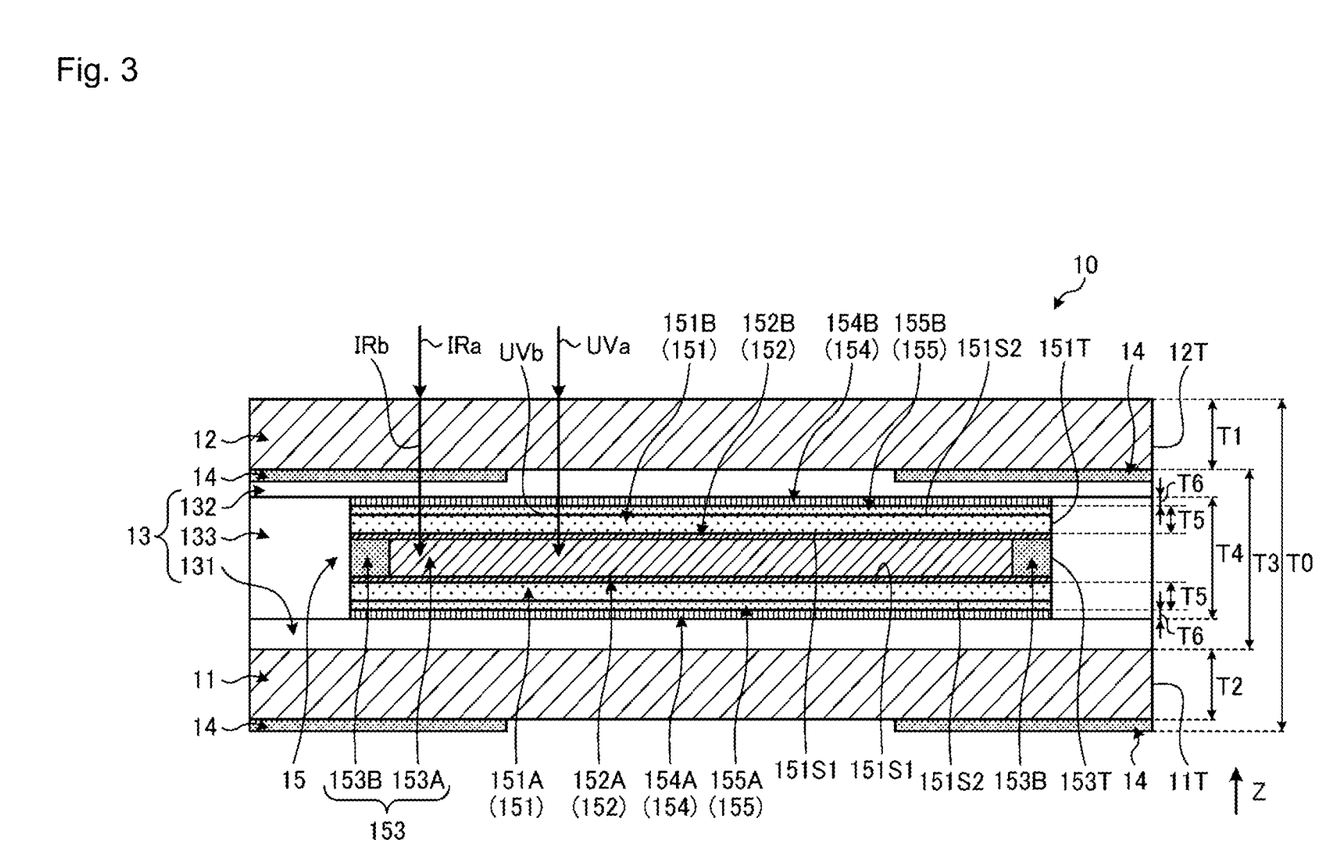
FIG. 3 is a schematic cross sectional view illustrating a laminated glass according to another example of the present embodiment.

The ultraviolet absorbing layer is not limited to being constituted by the protective film 154, and for example, the ultraviolet absorbing layer may be formed separately from the protective film 154. FIG. 3 is a schematic cross sectional view illustrating a laminated glass according to another example of the present embodiment. FIG. 3 illustrates an example in which the ultraviolet absorbing layer is separately formed. Also in a case where an ultraviolet absorbing layer 155 is separately formed as in FIG. 3, the protective film 154 is formed preferably on the outermost surface of the light control device 15 in the Z direction, and accordingly the ultraviolet absorbing layer 155 is formed between the protective film 154 and the liquid crystal layer 153 in the Z direction. In the example shown in FIG. 3, the ultraviolet absorbing layer 155 is formed between the substrate 151 and the protective film 154, however, the present invention is not limited thereto, and the ultraviolet absorbing layer 155 may be formed, for example, between the substrate 151 and the conductive film 152. Further, in the example shown in FIG. 3, the ultraviolet absorbing layer 155A is formed between the substrate 151A and the protective film 154A, and the ultraviolet absorbing layer 155B is formed between the substrate 151B and the protective film 154B. However, the ultraviolet absorbing layer 155A on the vehicle interior side may not be formed, and only the ultraviolet absorbing layer 155B on the vehicle exterior side may be formed. Further, the material of the ultraviolet absorbing layer 155 may be optional, and for example, in the same manner as in the case where the protective film 154 is the ultraviolet absorbing layer, the material may be one containing an ultraviolet absorber in the base material.

Further, the ultraviolet absorbing layer may be constituted by the substrate 151 or the interlayer 13. In such a case, the substrate 151 or the interlayer 13 functions as an ultraviolet absorbing layer since the ultraviolet absorber is contained in the base material. The base material hear means the above described material of the substrate 151 or the interlayer 13.

In view of excellent compatibility with the curable transparent resin or the transparent pressure-sensitive adhesive sheet, the ultraviolet absorber is preferably a benzotriazole compound or a benzophenone compound, more preferably a benzotriazole compound. As the benzotriazole compound, a commercial benzotriazole compound may be used. As the commercial benzotriazole compound, for example, Tinuvin 384-2, Tinuvin 326, Tinuvin 970, etc. manufactured by BASF may be mentioned, which are excellent in compatibility with the curable transparent resin. For example, even an ultraviolet absorber having low compatibility with a predetermine curable transparent resin can have improved compatibility by being modified to have a moiety having high compatibility to the curable transparent resin matrix bonded, and thus a wide range of ultraviolet absorbers may be used. That is, for example, for a silicone curable transparent resin, a silicone-modified ultraviolet absorber can suitably be used.

(Infrared Absorbing Layer)

The light control device 15 preferably contains an infrared absorbing layer which absorbs infrared light. By the light control device 15 containing the infrared absorbing layer, transmission of infrared light to the vehicle interior side can be suppressed, and a temperature increase in the vehicle can be reduced. The liquid crystal layer 153 may be deteriorated by heat or light by infrared light, and accordingly the infrared absorbing layer is formed preferably on the vehicle exterior side than the liquid crystal layer 153.

Here, as shown in FIG. 2, infrared light which enters from outside the glass plate12 on the vehicle exterior side into the laminated glass 10 is taken as infrared light IRa, and incident infrared light which enters from the glass plate 12, progresses inside the laminated glass 10 and enters the liquid crystal layer 153 is taken as IRb. And, the intensity of infrared light IRb to the intensity of infrared light IRa is taken as the infrared transmittance of the laminated glass 10. The infrared light IRb may be considered as infrared light IRa which has passed through a portion on the vehicle exterior side than the liquid crystal layer 153 in the laminated glass 10, and the infrared transmittance may be considered as the infrared transmittance of a portion on the vehicle exterior side than the liquid crystal layer 153 in the laminated glass 10. The infrared transmittance may be calculated in accordance with ISO 9050:2003. The infrared transmittance of the laminated glass 10 thus defined is, in a case where the infrared light has a wavelength of 1,000 nm, preferably 0% or more and 60% or less, more preferably 0% or more and 40% or less, further preferably 0% or more and 40% or less. With respect to the intensity of sunlight on the ground surface, the intensity of visible light is high, and in the infrared region, the intensity decreases as the wavelength is longer. Thus, a decrease in the transmittance at a wavelength of 1,000 nm is effective for decrease of the energy.

In the example of the present embodiment, it is preferred that the protective film 154 is the infrared absorbing layer. The protective film 154 functions as the infrared absorbing layer, for example, by an infrared absorber which can absorb infrared light contained in the base material. The base material here means the above-described material of the protective film 154, and the infrared absorber may, for example, be ITO (indium tin oxide) fine particles, ATO (antimony tin oxide) fine particles, LaB$_6$ (lanthanum hexaboride) or CWO (cesium tungsten oxide) fine particles. In this case, both the protective films 154A and 154B may be the infrared absorbing layers, or the protective film 154A on the vehicle interior side may not be the infrared absorbing layer and only the protective film 154B on the vehicle exterior side may be the infrared absorbing layer. In a case where the base material of the protective film 154 contains the ultraviolet absorber and the infrared absorber, the protective film 154 functions as an ultraviolet and infrared absorbing layer. Further, the protective film 154 may have a two or more layer structure having the ultraviolet absorbing layer and the infrared absorbing layer.

The infrared absorbing layer is not limited to being constituted by the protective film 154, and for example, the infrared absorbing layer may be formed separately from the protective film 154. In such a case, it is preferred to form the infrared absorbing layer on the position of the ultraviolet absorbing layer 155 as shown in FIG. 3. Further, in a case where both the ultraviolet absorbing layer and the infrared absorbing layer are formed, the ultraviolet absorbing layer 155 may be constituted to have a function as the infrared absorbing layer, or the ultraviolet absorbing layer 155 and the infrared absorbing layer may be separately formed.

Further, the infrared absorbing layer may be constituted by the substrate 151 or the interlayer 13. In such a case, the substrate 151 or the interlayer 13 functions as the infrared absorbing layer by the infrared absorbing layer contained in the base material. The base material here means the above-described material of the substrate 151 or the interlayer 13.

Further, the infrared absorbing layer may be contained in the glass plate 12, glass having infrared shielding treatment applied to the surface of the glass plate 12 may be used, or an infrared shielding film may be bonded to the glass plate 12.

(Method for producing laminated glass)

Now, the method for producing the above described laminated glass 10 will be described. To produce the laminated glass 10, the light control device 15 is produced. To produce the light control device 15, first, the substrate 151 is prepared, and the conductive film 152 is formed on the surface 151S1 on one side of the substrate 151. Then, the protective film 154 is formed on the surface 151S2 on the other side of the substrate 151. The order of formation of the conductive film 152 and the protective film 154 is optional. On the surface of the conductive film 152, an alignment film or an insulating layer may be formed. And, the surfaces on the conductive film 152 sides of the pair of the substrates 151 are made to face each other, and the liquid crystal layer 153 is formed between the pair of the substrates 151, whereby the light control device 15 having the protective film 154 formed on the outermost side is formed. However, the method for producing the light control device 15 is not limited thereto and for example, the protective film 154 may be formed later. That is, the liquid crystal layer 153 may be formed between the pair of the substrates 151 having the conductive film 152 formed thereon, and then the protective film 154 may be formed on the outermost side of the substrate 151.

After the light control device 15 is produced, the interlayer 13 and the light control device 15 are sandwiched between the glass plate 11 and the glass plate 12 to prepare a laminate. Since the outermost surface of the light control device 15 is protected by the protective film 154, the light control device 15 is prevented from being scarred in this process. The laminate prepared is put, for example, in a rubber bag and subjected to preliminary bonding under a pressure of −100 kPa or more and −65 kPa or less at a temperature of about 50° C. or more and about 110° C. or less. The heating conditions, the temperature conditions and the vacuum conditions for preliminary bonding, and the lamination method are properly selected considering the properties of the light control device 15, so that it will not be deteriorated during lamination.

Further, by contact bonding treatment of heat pressing the laminate in an autoclave for example at a temperature of 80° C. or more and 150° C. or less under a pressure of 0.6 MPa or more and 1.3 MPa or less, a laminated glass 10 with more excellent durability can be obtained. However, considering simplification of the process and properties of the material to be sealed in the laminated glass 10, in some cases, the heat pressing step may not be conducted.

In the process for preparing the laminate, in a case where the transparent pressure-sensitive adhesive sheet (OCA) is used for the interlayer 13, a first laminate having the light control device 15 bonded to the glass plate 12 via the interlayer 132 as a part of the interlayer 13, may be prepared, and the glass plate 11 is bonded to the light control device 15 side of the first laminate via the interlayer 131 as a part of the interlayer 13, to prepare the laminate. In such a case, a pressure-sensitive adhesive film may used for the interlayer 13, and the preliminary bonding step may be carried out by a roller bonding machine instead of a rubber bag.

The temperature conditions and the vacuum conditions are properly selected considering the properties of the light control device 15, so that it will not be deteriorated during lamination. Bonding at ordinary temperature is particularly preferred in that production will easily be conducted. Further, a frame-formed interlayer 133 disposed between the interlayer 131 and the interlayer 132 and surrounding the light control device 15 may further be provided.

Further, in the process for preparing the laminate, in a case where the curable transparent resin (OCR) is used for the interlayer 13, for example, the light control device 15 is inserted into a space between the glass plate 12 and the glass plate 11 to fix the position of the light control device 15 in the space between the glass plate 12 and the glass plate 11. The periphery of the space between the glass plate 12 and the glass plate 11 is sealed e.g. with a tape to distinguish the space from the outside. Into the space, the curable transparent resin is made to flow to fill the space with the curable transparent resin. And, by curing the curable transparent resin, the interlayer 13 is formed. The method of curing the curable transparent resin is optional and may, for example, be reaction curing, heat curing, photocuring or moisture curing.

In a case where the laminated glass 10 is curved, the glass plate 11 and the glass plate 12 may be bent by a conventional bending method. For example, the glass plate 11 and the glass plate 12 may be overlayed and placed on a ring-shaped mold, and heated to the softening temperature or more to be bent by their own weight. Otherwise, the glass plate 11 and the glass plate 12 may be heated and in such a state, they are pressed separately or as overlaid.

The above described process for producing the laminated glass 10 is an example, and the laminated glass 10 may be produced, for example, by a means such as cold bending.

Effects of the Present Embodiment

As described above, the laminated glass 10 according to the present embodiment has a pair of glass plates and the light control device 15 disposed between the pair of glass plates. The light control device 15 has the guest-host liquid crystal layer 153, the substrate 151, the conductive film 152 formed on one surface 151S1 of the substrate 151 and the protective film 154 formed on the other surface 151S2 of the substrate 151. The protective film 154 has abrasion resistance higher than that of the substrate 151. Here, if the outer surface of the light control device is scarred e.g. when the laminated glass is assembled (in other words, when the light control device is mounted in the laminated glass), the light control function may not properly be obtained. Whereas, the laminated glass 10 according to the present embodiment has the protective film 154 having hardness higher than that of the substate 151 formed on the surface 151S2 of the substrate 151. Thus, according to the laminated glass 10 according to the present embodiment, the light control device 15 can be prevented from being scarred and can properly exhibit light control function. Particularly by providing the protective film 154 to the guest-host light control device 15, it is possible to prevent scars and properly suppress defects in outer appearance.

Further, it is preferred that a pair of the conductive films 152 is provided to sandwich the liquid crystal layer 153, the substrate 151 includes a first substrate (substrate 151A) having one conductive film 152 formed on one surface 151S1 and a second substrate (substrate 151B) having the other conductive film 152 formed on one surface 151S1, and the protective film 154 includes a first protective film (protective film 154A) formed on the other surface 151S2 of the first substrate (the substrate 151A) and a second protective film (protective film 154B) formed on the other surface 151S2 of the second substrate (the substrate 151B). According to the laminated glass 10 according to the present embodiment, the light control device 15 can be prevented from being scarred and can properly exhibit light control function. Further, by the substrate surface of the light control device 15 having the protective film 154, it is not necessary to separately bond and peel a protective film on the substrate, and it is possible to continuously prevent the light control device 15 from being scarred. Particularly when the liquid crystal layer 153 has a liquid having high fluidity such as guest-host liquid crystal, TN liquid crystal, PC liquid crystal, STN liquid crystal, ECB liquid crystal, OCB liquid crystal, IPS liquid crystal or VA liquid crystal, the substrate and the liquid crystal layer 153 of the light control device 15 are likely to be separated. Accordingly, that it is not necessary to bond and peel the protective film contributes to more proper exhibition of the light control function.

The protective film 154 is preferably such that the change of the haze after abrasion resistance test as specified in JIS R3212:2015 for 100 rotations, is 0% or more and 20% or less. According to the laminated glass 10 according to the present embodiment, when the abrasion resistance of the protective film 154 is within such a range, the light control device 15 can be prevented from being scarred and can properly exhibit light control function.

The protective film 154 preferably contains at least one member selected from the group consisting of a cured product of a polymerization-curable compound having two or more polymerizable functional groups in its molecule (transparent coating film) and a cured product of a silicon-based alkoxide compound (transparent coating film). According to the laminated glass 10 according to the present embodiment, by using such a protective film 154, the light control device 15 can be prevented from being scarred and can properly exhibit light control function.

The substrate 151 preferably contains at least one member selected from the group consisting of polyethylene terephthalate, polyethylene naphthalate, polyamide, polyether, polysulfone, polyether sulfone, polycarbonate, polystyrene, cyclic polyolefin, polyarylate, polyetherimide, polyether ether ketone, polyimide, aramid, polybutylene terephthalate, triacetyl cellulose, polyurethane and a cycloolefin polymer. According to the laminated glass 10 according to the present embodiment, the protective film 154 can prevent the light control device 15 from being scarred, and the substrate 151 can improve the impact resistance. Particularly in the guest-host light control device 15, color shading can properly be suppressed The light control device 15 preferably contains an ultraviolet absorbing layer which absorbs ultraviolet light. According to the laminated glass 10 according to the present embodiment, by the ultraviolet absorbing layer, transmission of ultraviolet light can properly be suppressed.

It is preferred that the protective film 154 is the ultraviolet absorbing layer. According to the laminated glass 10 according to the present embodiment, when the protective film 154 is the ultraviolet absorbing layer, while the light control device 15 is protected from being scarred and transmission of ultraviolet light is properly suppressed, the film thickness becoming too large can be suppressed.

Further, the intensity of ultraviolet light having a wavelength of 380 nm which enters the laminated glass 10 from one glass plate 12 and enters the liquid crystal layer 153 (ultraviolet light UVb), to the intensity of ultraviolet light which enters one glass plate 12 (ultraviolet light UVa), is preferably 0% or more and 20% or less. When the ultraviolet transmittance is within such a range, transmission of particularly UVA (ultraviolet wave A) can properly be suppressed.

The light control device 15 preferably contains an infrared absorbing layer which absorbs infrared light. According to the laminated glass 10 according to the present embodiment, by the infrared absorbing layer, transmission of infrared light can properly be suppressed.

Further, it is preferred that the protective film 154 is the infrared absorbing layer. According to the laminated glass 10 according to the present embodiment, when the protective film 154 is the infrared absorbing layer, while the light control device 15 is prevented from being scarred and transmission of infrared light is properly suppressed, the film thickness becoming too large can be suppressed.

Further, the intensity of infrared light having a wavelength of 1,000 nm which enters the laminated glass 10 from one glass plate 12 and enters the liquid crystal layer 153 (infrared light IRb), to the intensity of infrared light which enters one glass plate 12 (infrared light IRa), is preferably 0% or more and 60% or less. When the infrared transmittance is within such a range, transmission of infrared light can properly be suppressed.

Further, between the pair of the glass plates 11 and 12, the interlayer 13 is provided, and the light control device 15 is disposed in the interlayer 13. According to the laminated glass 10 according to the present embodiment, by disposing the light control device 15 in the interlayer 13, deformation of the light control device 15 can be suppressed.

The interlayer 13 preferably contains at least one member selected from the group consisting of a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin and an ionomer resin. By using such an interlayer 13, color shading resulting from deviation of the film thickness of the liquid crystal layer 153 can be suppressed. Further, providing the substrate 151 according to the present embodiment to such an interlayer 13, is particularly effective to prevent a decrease of the impact resistance.

As the interlayer 13, at least one of the curable transparent resin (OCR) and the transparent pressure-sensitive adhesive sheet (OCA) may be used. By using the curable transparent resin or the transparent pressure-sensitive adhesive sheet, preparation of the laminate at ordinary temperature becomes possible, such being more preferred. As the curable transparent resin or the transparent pressure-sensitive adhesive sheet, an acrylic, silicone, urethane acrylate or epoxy type may, for example, be used.

The interlayer 13 has a shear modulus at 25° C. as obtained by dynamic viscoelasticity measurement at a measurement frequency of 1 Hz, of preferably $1.0 \times 10^3$ Pa or more and $100.0 \times 10^6$ Pa or less. By using such an interlayer 13, preparation of the laminate at ordinary temperature becomes possible, such being more preferred.

The laminated glass 10 according to the present embodiment is preferably glass for vehicles. The laminated glass 10 according to the present embodiment is effective particularly for glass for vehicles, since the light control device 15 can be prevented from being scarred.

EXAMPLES

Now, the present invention will be described in further detail with reference to Examples. Table 1 is a table illustrating Examples. However, it should be understood that the present invention is by no means restricted thereto.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Conditions | Laminated glass | First glass plate | VFL2.0 | VFL2.0 | VFL2.0 | VFL2.0 | VFL2.0 | VFL2.0 | VFL2.0 |
| | | First interlayer | Acrylic OCA | Acrylic OCA | Acrylic OCA | Acrylic OCA | Acrylic OCA | Silicone OCR | Acrylic OCA |
| | | First substrate | PC | PC | PET | PC | PC | PC | PC |
| | | First protective film | HR350 | HR350 | HR350 | HR350 | HR350 | HR350 | Nil |
| | | Second substrate | PC | PC | PET | PC | PC | PC | PC |
| | | Second protective film | HR350 | HR350 | HR350 | HR350 | HR350 | HR350 | Nil |
| | | Second interlayer | Silicone OCR | Silicone OCR | Silicone OCR | Silicone OCR | Silicone OCR | Acrylic OCA | Silicone OCR |
| | | Second glass plate | VFL2.0 | VFL2.0 | VFL2.0 | VFL2.0 | VFL2.0 | VFL2.0 | VFL2.0 |
| | Presence or absence of ultraviolet/infrared absorbing film | Ultraviolet absorbing film | Nil | Present (protective film) | Present (protective film) | Present (protective film) | Present (interlayer) | Present (interlayer) | Nil |
| | | Infrared absorbing film | Nil | Nil | Nil | Present (protective film) | Nil | Nil | Nil |
| Evaluation | | Handling scars | ◯ | ◯ | ◯ | ◯ | ◯ | ◯ | X |
| | | Weather resistance | Δ | ◯ | ◎ | ◎ | ◯ | ◎ | Δ |

Ex. 1

In Ex. 1, a laminated glass having a first glass plate, a first interlayer, a light control device, a second interlayer and a second glass plate laminated in this order from the vehicle exterior side toward the vehicle interior side was prepared. In Ex. 1 as the first glass plate and the second glass plate, VFL2.0 (thickness: 2 mm) manufactured by AGC Inc. was respectively used, as the first interlayer, acrylic OCA PD-S1 (thickness: 25 μm) manufactured by PANAC CO., LTD. was used, and as the second interlayer, two-liquid curable silicone OCR (trade name: SN1001) manufactured by Momentive was used. Further, in Ex. 1, as the light control device, a laminate having a first protective film, a first substrate, a guest/host light control portion, a second substrate and a second protective film laminated in this order from the vehicle exterior side toward the vehicle interior side was used. In Ex. 1, as the first substrate and the second substrate, polycarbonate (tradename: CARBOGLASS C110C) having a thickness of 100 μm manufactured by AGC POLYCARBONATE CO., LTD. was used, and as the first and second protective films, films were formed respectively in a thickness of 5 μm using hard coat liquid HR350 manufactured by The Yokohama Rubber Co., Ltd. HR350 contains dipentaerythritol hexaacrylate. In Ex. 1, no ultraviolet absorbing layer nor infrared absorbing layer was formed.

Ex. 2

In Ex. 2, a laminated glass was produced in the same manner as in Ex. 1 except that the first protective film was an ultraviolet absorbing layer. In Ex. 2, the first protective film as the ultraviolet absorbing layer was formed by adding, to the base material HR350, 6-methyl-heptyl 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionate as an ultraviolet absorber in an amount of 5 mass % to the whole first protective film.

Ex. 3

In Ex. 3, a laminated glass was produced in the same manner as in Ex. 2 except that the first substrate and the second substrate were respectively polyethylene terephthalate (tradename: COSMOSHINE A4360) having a thickness of 100 μm manufactured by TOYOBO CO., LTD.

Ex. 4

In Ex. 4, a laminated glass was produced in the same manner as in Ex. 2 except that the first protective film was an infrared absorbing layer. That is, in Ex. 4, the first protective film functions as the ultraviolet absorbing layer and as the infrared absorbing layer. In Ex. 4, the first protective film was formed by adding, to the base material HR350, 6-methyl-heptyl 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionate as an ultraviolet absorber in an amount of 5 mass % to the whole first protective film, and an ITO dispersion (PI-6T manufactured by Mitsubishi Materials Corporation) as an infrared absorber in an amount of 5 mass % to the whole first protective film.

Ex. 5

In Ex. 5, a laminated glass was produced in the same manner as in Ex. 1 except that the first interlayer was an ultraviolet absorbing layer. In Ex. 5, the first interlayer as the ultraviolet absorbing layer was formed by adding, to the base material two-liquid curable silicone resin, C7-C9-alkyl-3-[3-(2H-benzotriazol-2-yl)-5-(1,1-dimethylethyl)-4-hydroxyphenyl]propione ether as an ultraviolet absorber in an amount of 1 mass % to the whole first interlayer.

Ex. 6

In Ex. 6, a laminated glass was produced in the same manner as in Ex. 1 except that as the first interlayer, two-liquid curable silicone OCR (trade name: SN1001) manufactured by Momentive was used, as the second interlayer, acrylic OCA PD-S1 manufactured by PANAC CO., LTD. was used, and the first interlayer was an ultraviolet absorbing layer. As the ultraviolet absorber, a compound having 1,2-dibutyl-4-(4,7-dihydroxy-1,3-benzodithiol-2-ylidene)-3,5-pyrazolidinedione silicone-modified with an epoxy-modified silicone (manufactured by Shin-Etsu Chemical Co., Ltd., "KF-105") and an amine catalyst by stirring with heating at 80° C., was used. The silicone-modified ultraviolet absorber was added in an amount of 1 mass % to the whole first interlayer to form the first interlayer as the ultraviolet absorbing layer. That is, the first interlayer is a silicone OCR having the silicone-modified ultraviolet absorber dissolved.

Ex. 7

In Ex. 7, a laminated glass was produced in the same manner as in Ex. 1 except that no first protective film nor second protective film was provided.

(Evaluation)

With respect to the laminated glasses in Ex. 1 to 7, handling scars and weather resistance were evaluated.

To evaluate the handling scars, abrasion resistance test as specified in JIS R3212:2015 was conducted. A case where the change of the haze after 100 rotations was 20% or less was rated as ○, and a case where the change exceeded 20% was rated as x, and a case rated as ⊖ was considered passing. As shown in Table 1, Ex. 1 to 6 which are Examples of the present invention passed the evaluation of handling scars, and Ex. 7 which is a Comparative Example in which no protective film was provided, failed the evaluation of handling scars.

Evaluation of weather resistance is an optional evaluation. Using a xenon weather meter, the laminated glass was exposed at a black panel temperature of 83° C. with an amount of irradiation of 150 W for 1,500 hours, and then the visible light transmittance (Tv) in a dark state was measured. A case where the absolute value of the change of the visible light transmittance as between before and after the test is 1.5% or less, is rated as ◎, a case where it is 2.0% or less as ○, and a case where it is 5.0% or less as Δ. As shown in Table 1, by providing the ultraviolet absorbing layer or the infrared absorbing layer, weather resistance can be improved, such being more preferred.

The embodiments of the present invention have been described above, however, it should be understood that the present invention is by no means restricted thereto. The above constituents include those that can be easily expected by a person skilled in the art, those that are substantially the same, and those that are so-called equivalent. The above constituents may be properly combined. Further, various omissions, changes and modifications are possible without departing from the intension and the scope of the present invention.

REFERENCE SYMBOLS

10: laminated glass
11, 12: glass plate
13: interlayer
14: shielding layer
15: light control device
151, 151A, 151B: substrate
152, 152A, 152B: conductive film 153: liquid crystal layer
154, 154A, 154B: protective film

What is claimed is:

1. A laminated glass comprising:
a pair of glass plates; and
a light control device formed between the pair of glass plates, the light control device comprising a liquid crystal layer, a substrate, a conductive film formed on one surface of the substrate, and a protective film formed on the other surface of the substrate,
wherein:
the liquid crystal layer has at least one member selected from the group consisting of guest-host liquid crystal, TN liquid crystal, PC liquid crystal, STN liquid crystal, ECB liquid crystal, OCB liquid crystal, IPS liquid crystal and VA liquid crystal,
the protective film has abrasion resistance higher than that of the substrate,
an interlayer is provided in the pair of glass plates, and
the light control device is provided in the interlayer.

2. The laminated glass according to claim 1, wherein the liquid crystal layer is formed of guest-host liquid crystal.

3. The laminated glass according to claim 1, wherein the conductive film includes a first conductive film and a second conductive film sandwiching the liquid crystal layer,
the substrate includes a first substrate having the first conductive film formed on one surface and a second substrate having the second conductive film formed on one surface, and
the protective film includes a first protective film formed on the other surface of the first substrate and a second protective film formed on the other surface of the second substrate.

4. The laminated glass according to claim 1, wherein the protective film contains at least one member selected from the group consisting of a cured product of a polymerization-curable compound having two or more polymerizable functional groups in its molecule, and a cured product of a silicon-based alkoxide compound.

5. The laminated glass according to claim 1, wherein the substrate contains at least one member selected from the group consisting of polyethylene terephthalate, polyethylene naphthalate, polyamide, polyether, polysulfone, polyethersulfone, polycarbonate, polystyrene, cyclic polyolefin, polyarylate, polyetherimide, polyether ether ketone, polyimide, aramid, polybutylene terephthalate, triacetyl cellulose, polyurethane and a cycloolefin polymer.

6. The laminated glass according to claim 1, wherein the light control device contains an ultraviolet absorbing layer.

7. The laminated glass according to claim 6, wherein the protective film is the ultraviolet absorbing layer.

8. The laminated glass according to claim 6, wherein, to the intensity of ultraviolet light having a wavelength of 380 nm which enters the laminated glass from outside of one of the pair of glass plates, the intensity of ultraviolet light which progresses inside the laminated glass and enters the liquid crystal layer, is 0% or more and 20% or less.

9. The laminated glass according to claim 1, wherein the light control device contains an infrared absorbing layer.

10. The laminated glass according to claim 9, wherein the protective film is the infrared absorbing layer.

11. The laminated glass according to claim 9, wherein, to the intensity of infrared light having a wavelength of 1,000 nm which enters the laminated glass from outside of one of the pair of glass plates, the intensity of infrared light which progresses inside the laminated glass and enters the liquid crystal layer, is 0% or more and 60% or less.

12. The laminated glass according to claim 1, wherein the interlayer contains at least one member selected from the group consisting of a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin and an ionomer resin.

13. The laminated glass according to claim 1, wherein the interlayer contains at least one of a transparent pressure-sensitive adhesive sheet and a curable transparent resin.

14. The laminated glass according to claim 13, wherein:
the interlayer comprises a first interlayer and a second interlayer; and
the first interlayer and the second interlayer are formed from a transparent pressure-sensitive adhesive sheet and a curable transparent resin.

15. The laminated glass according to claim 14, wherein the first interlayer is disposed on a vehicle interior side relative to the second interlayer; and
the first interlayer is the transparent pressure-sensitive adhesive sheet, and the second interlayer is the curable transparent resin; or
the first interlayer is the curable transparent resin, and the second interlayer is the transparent pressure-sensitive adhesive sheet.

16. The laminated glass according to claim 1, wherein the interlayer has a shear modulus at 25° C. as obtained by dynamic viscoelasticity measurement at a measurement frequency of 1 Hz of $1.0 \times 10^3$ Pa or more and $100.0 \times 10^6$ Pa or less.

17. The laminated glass according to claim 1, wherein the liquid crystal layer comprises a light control portion comprising a liquid crystal composition configured to conduct light control and a sealing material configured to seal the outside of the light control portion.

18. The laminated glass according to claim 1, wherein the substrate extends to the outside of a peripheral portion of the liquid crystal layer in the emission direction.

19. The laminated glass according to claim 1, wherein the thickness of the interlayer is 0.3 mm or more at a thinnest portion and has a maximum value of 3 mm or less.

20. The laminated glass according to claim 1, wherein both of the pair of glass plates have a curved shape.

* * * * *